(12) United States Patent
Dufort

(10) Patent No.: US 8,923,616 B2
(45) Date of Patent: Dec. 30, 2014

(54) IMAGE-CONTENT DEPENDENT PRINT CUTTING SYSTEM

(75) Inventor: Ron Edward Dufort, Rochester, NY (US)

(73) Assignee: Xerox Coporation, Norwalk, CT (US)

( * ) Notice: Subject to any disclaimer, the term of this patent is extended or adjusted under 35 U.S.C. 154(b) by 456 days.

(21) Appl. No.: 13/194,372

(22) Filed: Jul. 29, 2011

(65) Prior Publication Data

US 2013/0028648 A1 Jan. 31, 2013

(51) Int. Cl.
*G06K 9/34* (2006.01)
*B41J 11/66* (2006.01)
*G06F 3/12* (2006.01)

(52) U.S. Cl.
CPC ............ *B41J 11/663* (2013.01); *G06F 3/1208* (2013.01); *G06F 3/1264* (2013.01); *G06F 3/1285* (2013.01)
USPC ....................................................... 382/173

(58) Field of Classification Search
USPC ........................................................ 382/173
See application file for complete search history.

(56) References Cited

U.S. PATENT DOCUMENTS

| 4,918,611 A * | 4/1990 | Shyu et al. ..................... 382/100 |
| 7,164,490 B2 * | 1/2007 | Manico et al. ............... 358/1.18 |
| 8,411,960 B2 * | 4/2013 | Misawa et al. ................ 382/190 |
| 2003/0099396 A1 * | 5/2003 | Nakamura et al. ............ 382/173 |
| 2009/0285590 A1 | 11/2009 | Orsley |
| 2010/0278573 A1 | 11/2010 | Richards et al. |

OTHER PUBLICATIONS (McHenry, Kenton Guadron, Llearning to Segment Images Into Material and Object Classes, University of Illinois at Urbana-Champagin, 2008).*

* cited by examiner

*Primary Examiner* — Stephen R Koziol
*Assistant Examiner* — Totam Le
(74) *Attorney, Agent, or Firm* — Hoffmann & Baron, LLP

(57) ABSTRACT

Embodiments described herein include an image-content dependent system for cutting a print in response to content of an image disposed on the print. The system includes a print cutter, a computer storage device, and a processing device. The print cutter cuts a print according to an image-content dependent cut pattern. The computer storage device stores image component metadata created from image content of an image disposed on the print to be cut. The processing device uses the image component metadata to generate the image-content dependent cut pattern to be used by the print cutter to cut the print.

20 Claims, 5 Drawing Sheets

IMAGE-CONTENT DEPENDENT PRINT CUTTING SYSTEM

BACKGROUND

1. Technical Field

The presently disclosed embodiments are directed to a print-cutting system and more specifically to a print-cutting system responsive to image content of the print to cut the print based on image content of the print.

2. Brief Discussion of Related Art

Custom-printed products are commercially available in many standard shapes and forms (e.g. vendors print personal photographs and cut them into custom puzzles, greeting cards, wall-art, calendars, labels, etc.). A typical print-cutting system uses trim blades, dies, lasers, or other similar methods to incise (or perforate) each sheet in various places to create the desired forms.

Traditional print-cutting systems typically use the same pattern to cut all sheets in a single run. In some instances conventional print-cutting systems can change patterns one or more times during a single run. While the cut-patterns on such systems may be changed on during a single run, the patterns are typically not linked to the actual images disposed on the sheets (e.g. puzzles are routinely made from photographs, but the shapes of the pieces do not relate to the specific content captured in each photo). As a result, conventional print-cutting systems are typically not responsive to image content when configuring the cut pattern to be used to cut the sheet on which the image is disposed.

SUMMARY

According to aspects illustrated herein, there is provided an image-content dependent system for cutting a print in response to content of an image disposed on the print. The system includes a print cutter, a computer storage device, and a processing device. The print cutter is configured to cut a print according to an image-content dependent cut pattern. The computer storage device stores image component metadata created from image content of an image disposed on the print to be cut. The processing device uses the image component metadata to generate the image-content dependent cut pattern to be used by the print cutter to cut the print.

According to other aspects illustrated herein, there is provided an image-content dependent system for cutting a print in response to content of an image disposed on the print. The system includes a job configuration system, a printing system, and a cutting system. The job configuration system generates a print job that includes images and generates image component metadata from image content of each of the images of the print job. The printing system prints the images of the print job on substrate media to form prints. The cutting system generates image-content dependent cut patterns for each of the prints received from the printing system using the image component metadata corresponding to the images printed on the prints and to cut of the prints according to the image-content dependent cut patterns.

According to further aspects illustrated herein, there is provided a method for cutting a print. The method includes generating image component metadata from image content of an image disposed on the print to be cut, generating an image-content dependent cut pattern using the image component metadata, configuring a print cutter to cut a print according to the image-content dependent cut pattern, and cutting the print with the print cutter according to the image-content dependent cut pattern.

DETAILED DESCRIPTION

Figure 1:
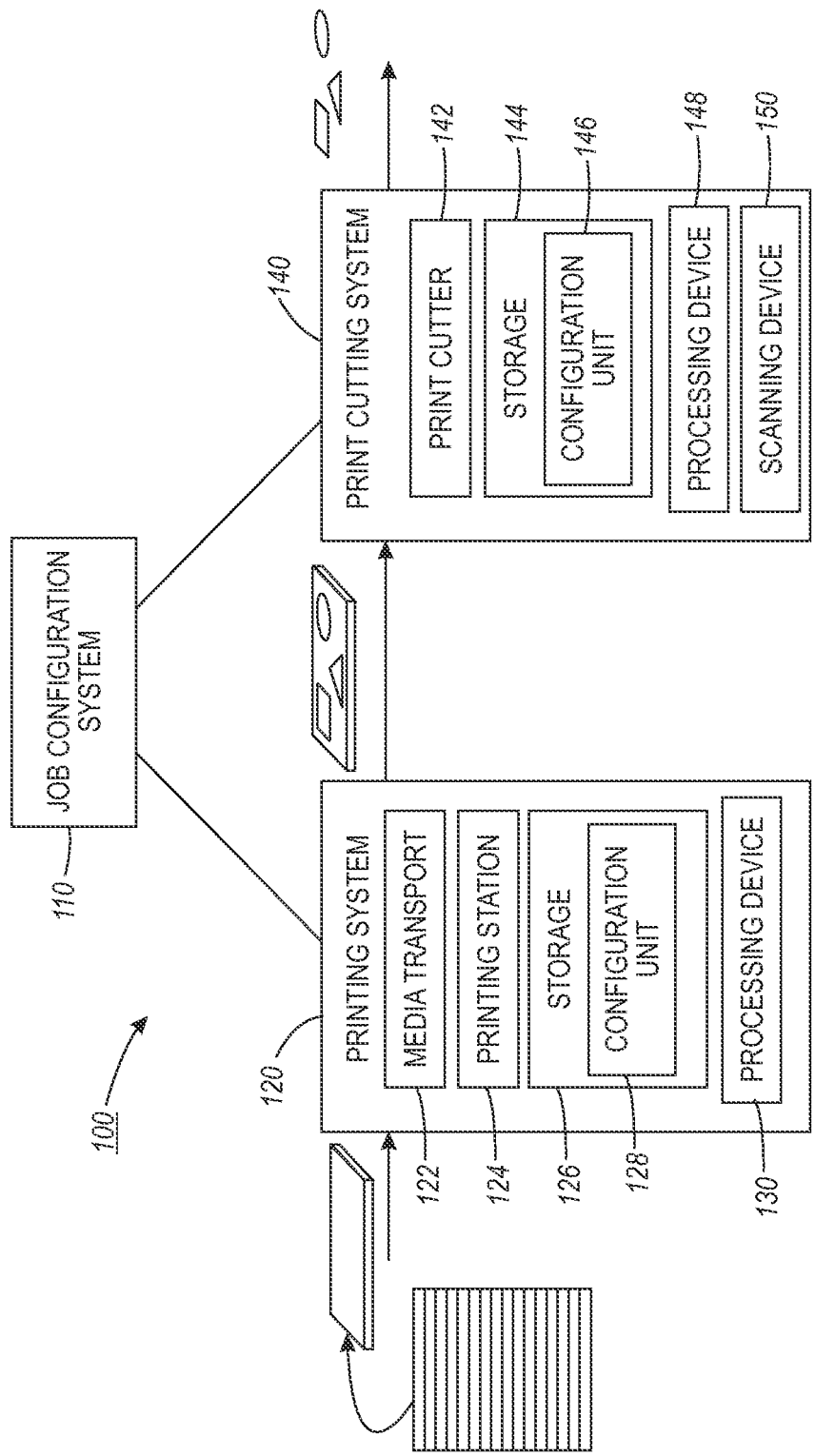
FIG. 1 depicts a block diagram of an exemplary image-content dependent print cutting system.

Exemplary embodiments include an image-content dependent print cutting system that is responsive to image content of prints to be cut so that cut patterns used by the print cutting system are dependent on the content of the images disposed on the prints. Embodiments of the print cutting system can generate different cut patterns for different images and can be configured to cut the prints to correspond to the content of the images. Some embodiments of the print cutting system can use custom image processing to recognize images and/or image components within an image to generate image information to be used when configuring a cut pattern of the print cutting system. Some embodiments can use variable data generated images with known image information to be used when configuring a cut pattern of the print cutting system. The print cutting system can associate image information corresponding to images and/or image components to be printed and can custom-cut prints in response to the images and/or image components disposed on the prints.

As used herein, an "image" refers to visual representation, such as a picture, photograph, computer document including text, graphics, pictures, and/or photographs, and the like, that can be rendered by a display device and/or printed on substrate media.

As used herein, an "image component" refers to a portion of an image having definable boundaries and "image component metadata" refers to information generated using the image component. Some examples of image component metadata can include a geometry or shape of the image component, position/location of the image component in the image, coordinates corresponding to an outline or boundary of the image component, an orientation of the image component in the image, contrast of the image component to the surrounding area in the image, color, information identifying an outline and/or contour of the image component, and the like.

As used herein, "segmenting" refers to dividing, partitioning, and/or separating into segments or components, such as segmenting an image into image components.

As used herein, an "image segmenter" refers to a tool for segmenting an image into image components.

As used herein, a "print cutter" refers to a machine, device, apparatus, and the like, that cuts a print according to a cut pattern.

As used herein, "cut" refers to at least partially severing, tearing, separating, and the like.

As used herein, "print" refers to a substrate media on which an image is disposed.

As used herein, "cut pattern" refers a spatial configuration corresponding to locations, areas, boundaries, outlines, and the like, to be cut, and an "image-content dependent cut pattern" refers to a cut pattern that is generated using image component metadata of an image on a print to be cut so that the cut pattern.

As used herein, "dependent" refers to something that conditioned, contingent, or determined based on something else. For example, a cut pattern can be dependent On the content of the image.

As used herein, a "computer storage device" refers to a device for storing information and can be implemented using, for example, computer medium technologies, such as a floppy drive, hard drive, compact disc, tape drive, Flash drive, optical drive, read only memory (ROM), random access memory (RAM), and the like.

As used herein, a "processing device" refers to a controller or processor that executes instructions implement a process, procedure, computation, and the like.

As used herein, "content" refers to being included, contained, illustrated, or otherwise present within an image. For example, content of an image can include image components in the image, colors of the image, objects in the image, and the like.

As used herein, "print-by-print basis" refers to performing a process, routine, procedure, task, and the like, for each print.

As used herein, "image segmentation process" refers to a process by which an image is decomposed into image components.

As used herein, "variable data image generator" refers to a component implemented using software and/or hardware to generate images based on rules by inserting image components into an image in accordance with the rule.

As used herein, a "scanning device" refers to a device that generates a digital replication of an image disposed on a print.

As used herein, a "job configuration system" refers to a device, machine, apparatus, and the like, for specifying a print job, processing images of a print job, configuring a printing system and/or a cutting system, and the like.

As used herein, a "print job" refers to a set of one or more images to be printed by a printing system and/or cut by a cutting system.

As used herein, a "printing system" refers to a device, machine, apparatus, and the like, for forming images on substrate media using ink, toner, and the like, and a "multi-color printing system" refers to a printing system that uses more than one color (e.g., red, blue, green, black, cyan, magenta, yellow, clear, etc.) ink or toner to form an image on substrate media. A "printing system" can encompass any apparatus, such as a printer, digital copier, bookmaking machine, facsimile machine, multi-function machine, etc. which performs a print outputting function. Some examples of printing systems include Direct-to-Paper (e.g., Direct Marking), modular overprint press (MOP), ink jet, solid ink, as well as other printing systems.

As used herein, a "cutting system" refers to a device, machine, apparatus, and the like, for cutting prints according to a cut pattern. Cuts made by a print cutter include through-cuts, partial-depth cuts, perforations, and the like.

As used herein, "substrate media" refers to a tangible medium, such as paper (e.g, a sheet of paper, a long web of paper, a ream of paper, etc.), transparencies, parchment, film, fabric, plastic, or other substrates on which an image can be printed or disposed.

FIG. 1 depicts a block diagram of an exemplary image-content dependent print cutting system 100 (hereinafter "system 100"). The system 100 can include a job configuration system 110, a printing system 120, and a print cutting system 140. The system 100 facilitates a custom print cutting process that can respond to images disposed on the prints to configure the print cutting system so that a image-content dependent cut pattern used by the system 100 to cut a print is generated based on the content of the image disposed on the print. Those skilled in the art will recognize that the system 110, printing system 120, and cutting system 140 can be implemented separately, integrally, in combination with one another, and the like.

The system 110 can process images in a print job to identify image components within the images. The identified image components can have any form, such as geometric shapes, graphics, objects, textual characters, symbols, and the like. Image component metadata about the identified image components, such as geometry, position/location of the image components in the image, orientation of the image components in the image, contrast of the image components to the surrounding area in the image, color, information identifying an outline and/or contour of the image components, and the like, can be associated with the images.

In some embodiments, the system 110 can search an image in a print job for image components and can segment the image into image components using one or more segmentation processes. As one example, the system 110 can use image component recognition software to identify image components in an image based on the characteristics of the image components. As another example, image components of an image can be predetermined such that the system 110 can identify the image components based on information in the image file and/or information associated with the image file.

In some embodiments, the system 110 can manipulate variable data images in a print job to insert image components. For example, the system 110 can insert image components, such as text, symbol, graphical components, and the like, into images at locations identified as being variable. Image component metadata for the image components inserted into the images can be known since the system 110 inserts the image components into the images.

The system 110 can be in communication with the printing system 120 and/or the cutting system 140. For example, the system 110 can send a print job to the printing system 120 and/or the cutting system 140. The print job can include one or more images to be printed by the printing system and/or to be used by the cutting system 140 when cutting prints generated using the images. In some embodiments, the print job can include image component metadata corresponding to the images in the print job.

In some embodiments, the system 110 can manage the printing system 120 and/or cutting system 140 to coordinate the printing and/or cutting processes so that image component metadata corresponding to an image disposed on a print is used by the cutting system 140 to cut the print. For example, the system 110 can track the progress of the print job so that after a print generated by the printing system 120, the system 110 can identify the image component metadata corresponding to the image disposed on the print and can communicate with the cutting system to identify the appropriate image component metadata to use when configuring the cutting system to cut the print. Those skilled in the art will recognize that the system 110 and/or portions thereof can be integrated into the printing system 120 and/or the cutting system 140.

The printing system 120 can be implemented as a direct marking printer (e.g., Direct-to-Paper or Image-on-Paper printer), modular overprint press (MOP) printer, xerographic-based printer, electrostatic-based printer, ink jet printer, laser printer, solid ink printer, and the like. The printing system 120 can include a media transport 122, a printing station 124, a computer storage device 126, and a processing device 130. The printing system 120 can receive images for a print job from the job configuration system 110 and can print the images on substrate media to form prints. The media transport 122 can include belts, rollers or nips, and/or other devices or structures for transporting substrate media through the printing system 120 and passed the printing station 124.

The printing station 124 can include one or more image marking units to dispose ink or toner on the substrate media as the substrate media passes the printing station 124. In some embodiments, the marking units can be implemented using an intermediate transfer belt or drum onto which an image is disposed before being transferred to the substrate media. The image can be transferred from the intermediate transfer belt or drum to the substrate media as the substrate media passes the printing station. In some embodiments, the image marking units can be implemented as one or more print heads that eject ink or toner directly on substrate media as the substrate media passes through the printing station. Those skilled in the art will recognize that the printing system 120 can have more than one printing station.

The storage 126 can include a print system configuration unit 128. The storage 126 can be implemented using computer medium technologies, such as a floppy drive, hard drive, compact disc, tape drive, Flash drive, optical drive, read only memory (ROM), random access memory (RAM), and the like. The print system configuration unit 128 can include parameters for controlling the operation of the print system 120 and can include image component metadata associated with images to be printed by the printing system. For example, the print system configuration unit 128 can include image component metadata associated with images, such as objects or components of the image, parameters related to the images to be printed including colors, size, and quality, as well as the images themselves; parameters related to the substrate media being used, such as size, weight, type, color; and the like.

The processing device 130 can process the print job to print the images in the print job. Once the prints are generated, the prints can be transported to the print cutting system 140. In some embodiments, the prints can be transported to the print cutting system 140 by the media transport 122. In some embodiments, the prints can be manually transported to the print cutting system 140.

In some embodiments, the image component metadata associated with the images disposed on the prints can travel through the process with the images such that the printing system 120 can be in communication with the cutting system 140 to forward image component metadata corresponding to the image disposed on a print being transferred to the cutting system so that the cutting system can use the image component metadata to configure the cutting system to cut the print.

The print cutting system 140 can include a print cutter 142, storage 144, and a processing device 148. The print cutting system 140 can be responsive to image component metadata to generate image-content dependent cut patterns on a print-by-print basis. In some embodiments, the cutting system 140 can include a scanning device 150. The cutting system 140 can receive prints having images dispose thereon from the printing system 120 and can receive image component metadata from the system 110 and/or the printing system 120 corresponding to the images disposed on the prints. As one example, the print cutting system 140 can receive the image component metadata as the printing system 120 prints the image on the substrate media so that the cutting system receives the image component metadata from the printing system 120 as the print is being received from the printing system. As another example, the cutting system 140 can receive the image component metadata from the system 110 as the printing system transfers a print to the cutting system 140 that includes an image corresponding to the image component metadata. As yet another example, the image component metadata can be transferred to the cutting system 140 from the system 110 and/or the printing system 120 as a sequenced order in which the prints are to be generated. In this example, as the cutting system 140 receives prints, the cutting system 140 can retrieve the image component metadata according to the sequence so that the image component metadata retrieved corresponds to the image disposed on the prints to be cut.

The print cutter 142 can be a laser-based cutter, a blade-based cutter, die-based cutter, and the like, and can be configured on a print-by-print basis to allow custom cutting of the prints. Image-content dependent cut patterns used by the print cutter can be linked to the content of the images on the prints to be cut such that the image-content dependent cut patterns are dependent on the content of the images. For example, image-content dependent cut patterns can be generated by the print cutter 142 on a print-by-print basis in response to the image component metadata associated with the image to be disposed on prints to be cut. In some embodiments, the print cutter 142 can be configured using image component metadata corresponding to images disposed on the prints so that print cutter 142 can be configured, for example, to cut the print to correspond to image components in the images. For example, the print cutter 142 can be configured to cut the image components out of the prints along an outline of the image components, an outline of the union between the outlines of multiple image components, and the like. Using this approach, embodiments of the print cutter 142 can cut differently shaped image components in a single print and/or can generate image-content dependent cut patterns to cut out differently shaped image components across different prints. Cuts made by the print cutter can be through-cuts, partial-depth cuts, perforations, and the like.

The storage 144 can include a cut configuration unit 148. The storage 144 can be implemented using computer readable medium technologies, such as a floppy drive, hard drive, compact disc, tape drive, Flash drive, optical drive, read only memory (ROM), random access memory (RAM), and the like. The configuration unit 146 can include parameters for controlling the operation of the print cutter 142. For example, the configuration unit 146 can include parameters related to the locations on the prints that are to be cut, the type of cuts to be performed (e.g., through cut, perforation, etc.), image component metadata corresponding to the images disposed on the prints received by the print cutting system 140, and the like, and can be used to generate image-content dependent cut patterns.

The processing device 148 can interface with the configuration unit 148 and can control the cutting system 140 to process the prints received from the printing system 120. When a print is received by the cutting system 140, the processing device 148 can retrieve image component metadata corresponding to an image disposed on a print and can interface with the configuration unit 146 to configure the print cutter 142 with a image-content dependent cut pattern using the image component metadata so that the print cutter 142 cuts the print using the image-content dependent cut pattern in response to the image disposed on the print.

In some embodiments, the cutting system 140 can include an image scanning device 150. The image scanning device 150 can scan prints received by the cutting system 140 to scan the images from prints. The images scanned from the prints can be processed by components of the system 110 to generate image component metadata. For example, the images scanned from the prints can be processed using one or more image component recognition processes implemented by the system 110. The image component metadata corresponding to the scanned image can be used to generate image-content dependent cut patterns.

Figure 2:
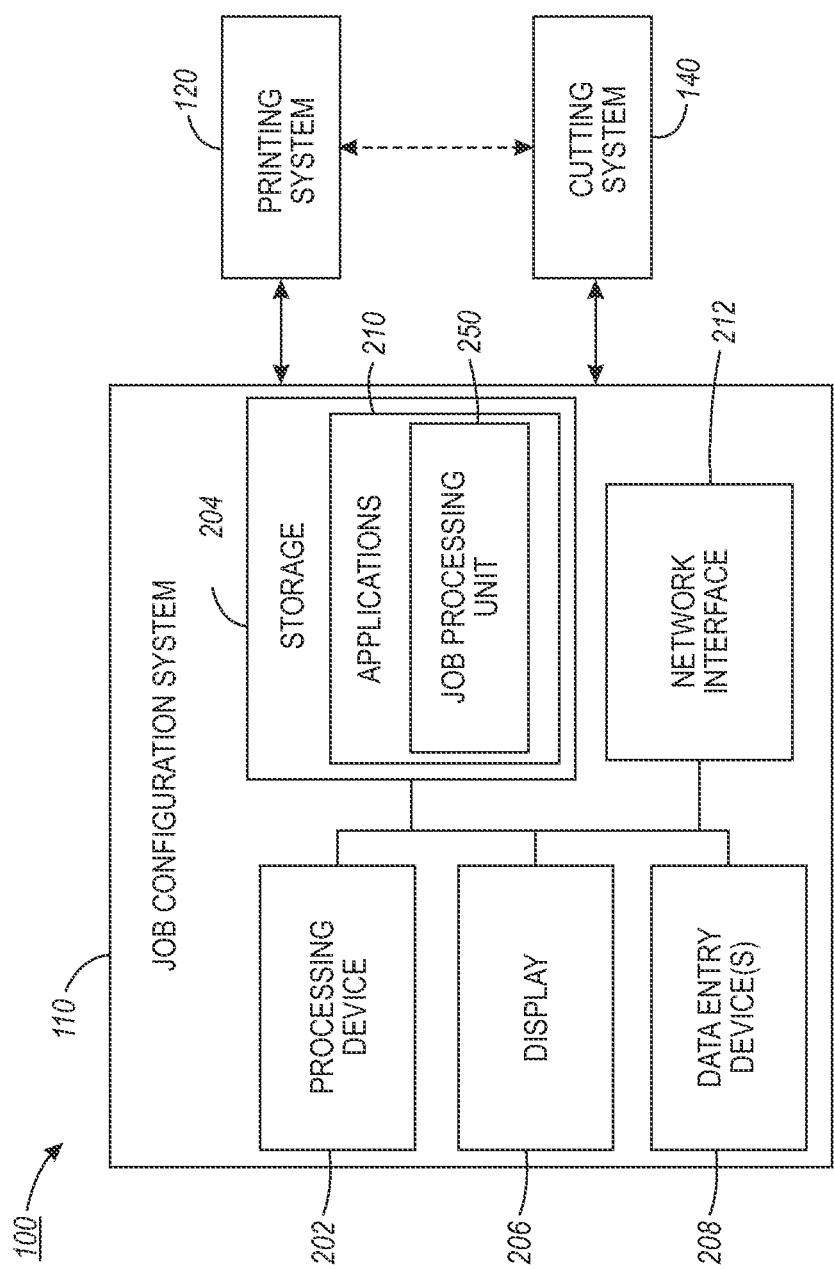
FIG. 2 depicts an exemplary job management system for processing and/or managing images in a print/cut job.

FIG. 2 depicts an exemplary embodiment of the system 110. The system 110 can be implemented as a computing device, such as a mainframe; personal computer (PC); laptop computer; workstation; handheld device, such as a PDA and/or smart phone; and the like, and can be communicatively coupled to the printing system 120 and/or the cutting system 140. In the illustrated embodiment, the system 110 can include a central processing unit (CPU) 202 and can include a storage device 204 for storing executable instructions and/or data. The system 110 can also include a display device 206 to enable the system 110 to communicate with an operator through a visual display. The system 110 can further include data entry device(s) 208, such as a keyboard, touch screen, microphone, and/or mouse. The storage 204 can include computer readable medium technologies, such as a floppy drive, hard drive, compact disc, tape drive, Flash drive, optical drive, read only memory (ROM), random access memory (RAM), and the like.

Applications 210, such as a job processing unit 250 (hereinafter "unit 250"), or portions thereof, can be resident in the storage 204. The applications 210 can include instructions for implementing the unit 250 to process images in a print job to identify image component metadata corresponding to the images of the print job. The instructions can be implemented using, for example, C, C++, Java, JavaScript, Basic, Perl, Python, assembly language, machine code, and the like. The storage 204 can be local or remote to the system 110. The system 110 includes a network interface 212 for communicating with a network. The CPU 202 operates to run the applications 210 in storage 204, including the unit 250, by executing instructions therein and storing data resulting from the performed instructions, which can be output to the printing system 120, the cutting system 140, and/or the display 206. Those skilled in the art will recognize that the unit 250, or portions of the unit 250, can be implemented as part of the printing system 120 and/or the cutting system 140.

Figure 3:
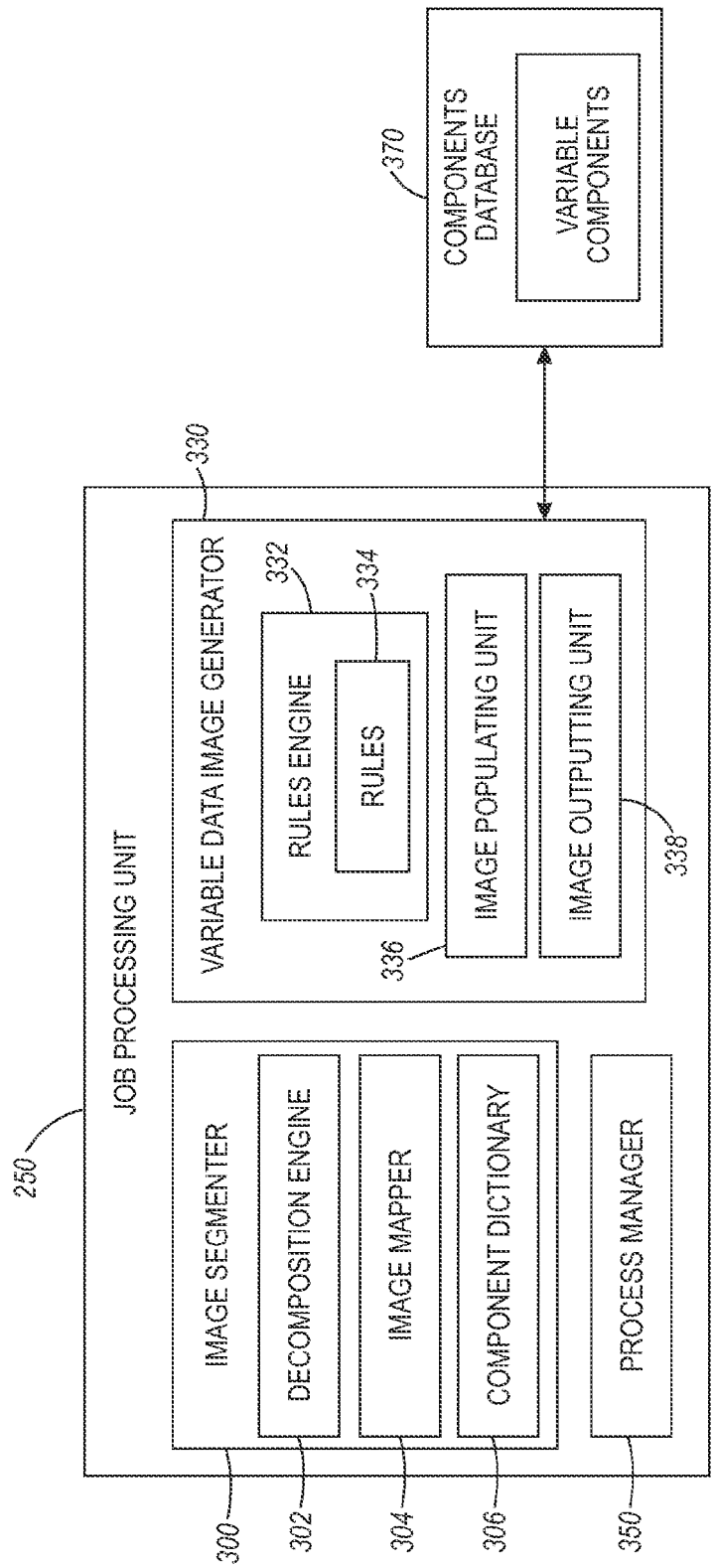
FIG. 3 is a block diagram of an exemplary job configuration unit.

FIG. 3 depicts a block diagram of an exemplary embodiment of the unit 250. The unit 250 can include an image segmenter 300 and/or a variable data image generator 330. In some embodiments, the unit 250 can include a print manager 350 and/or a print cutting manager 360.

The image segmenter 300 can segment an image into image components using one or more image segmentation processes. The image segmenter 300 can include an image decomposition engine 302 and an image component mapper 304. In some embodiments, the image segmenter 300 can include a component dictionary 306. The image segmenter 300 can classify the image components based on the content of the image components and can assign an identifier to each of the image components of an image.

In some embodiments, the unit 250 can receive an image that is already segmented. For example, some images can be created using a page description language such that components of an image are identified in the image file and/or a file associated with the image. In these embodiments, the unit 250 can bypass the image segmenter 300 or can process the image using the image segmenter 300 to generate its own segmentation. When the previously segmented image is processed using the image segmenter 300, the image segmenter 300 can ignore the image component information and can segment the image using one or more segmentation processes implemented by the image segmenter 300. Alternatively, the image segmenter 300 can use the image components identified in the image and can process the image to identify other image components and/or assign its own identifier to the image components.

The decomposition engine 302 can deconstruct an input image to segment the image into image components using one or more segmentation processes. The one or more segmentation processes can identify image component based on boundaries analysis, object recognition, pattern recognition, and the like. As one example, the decomposition engine 302 can be configured to use boundary analysis to identify natural boundaries between image components based on, for example, color transitions, contrast, borders, outlines, and the like. As another example, the decomposition engine 302 can recognize objects or patterns by comparing the objects and/or patterns to stored objects and/or patterns, such as text, symbols, graphics, and the like. In some embodiments, the decomposition engine can use a combination of segmentation processes to segment the input image into image components.

In some embodiments, the segmentation process of the decomposition engine 302 can use background identification based segmentation, which can model an input image as a combination of background layers. To segment the input image into image components, the background identification segmentation can identify a main background and image components on the main background. The image components can be classified as text, graphics, symbols, composite image components, and the like. A composite image component is an image component that is itself formed from image components. A composite image component can have a local background, which can overlay the main background and can be identified. Once the local background is identified, the segmentation process identifies the image component of the composite image component.

In some embodiments, the segmentation process of the decomposition engine 302 can segment and classify an image into foreground/background, graphics/images and small/normal sized. The distinction between background and foreground image components can be made by evaluating data seams at image component boundaries, determining whether one object overlays another, and the like. Using this approach, the segmentation process can generate bit maps. As an example, when the image is a portable document format (PDF) file, a first bit map can be what normally results when an image is rendered and can have a width and height as indicated by values in the image description that controls the page size. The dimensions of the first bit map (e.g., widths, heights, etc.) are determined by the image description and the resolution at which the page is rendered. The second bit map can indicate the order in which objects are painted (e.g., rendered) in the image with respect to an image display list (e.g., a content stream). Image components appearing early in the display list may be painted over by succeeding image components in the display list. The third bitmap can indicate image component type for pixels in the first bit map, such as text, picture, graphics, symbols, and the like. From these three bitmaps, the boundaries between two touching image components can be identified and classified as real or imaginary, where image components that touch each other without a real boundary are merged into a single image component. Input image segmentation implemented using bit maps is described in more detail in copending U.S. Publication No. 2010/0021069, filed on Jul. 22, 2008, which is incorporated herein by reference in its entirety.

In some embodiments, the segmentation process of the decomposition engine 302 can use object or component recognition algorithms to segment an image. For example, the decomposition engine 302 can scan the image to identify patterns, geometries, shapes, and/or other object characteristics. The object characteristics can be compared to stored object characteristics of known objects or components. For example, the decomposition engine 302 can compare the object characteristics to objects or components in the component dictionary 306. Based on the comparison, the objects identified in the scan can be associated with the known objects, can receive component identifiers, and can be classified into a component type.

The image segmenter 300 can generate image component information for the image components in the images. Image component information can include, for example, geometry, position/location of the image components in the image, orientation of the image components in the image, contrast of the image components to the surrounding area in the image, color, information identifying an outline and/or contour of the image components, and the like, can be associated with the images.

The image component mapper 304 can assign component identifiers to each of the image components generated by the decomposition engine 302, can classify the image components based on the content of the image components, and can associate the image component information with the identifier. In some embodiments, the component identifiers can be unique for each image component in the image. The image components can be classified by type. For example, the image components can be classified as text, pictures, symbols, geometric shapes, graphics, and the like. In some embodiments, a portion of the component identifier can reference the type of content included in the image component.

The image component dictionary 306 can include image component references that can be used by the image segmenter 300 to identify image components. For example, the image segmenter 300 can search the image for image components that match and/or satisfy the image component references in the image component dictionary 306. In some embodiment, when the image segmenter 300 does not recognize an image, the image segmenter can prompt the user to identify the image component. Once the user identifies the image component, the image segmenter can add the image component to the dictionary to use for subsequent image decomposition.

The variable data image generator 330 can include a rules engine 332, an image populating unit 336, and an image outputting unit 338. The generator 330 provides images that can be generated to include components 370 stored in a component database 372. For example, the generator 330 can generate an image by inserting one or more components into an image at predefined variable locations. Variable image components 370 can include, for example, textual components, graphical, symbol components, and the like, that can be inserted into the images at locations identified as being variable.

The rules engine 332 includes populating rules 334 (hereinafter "rules 334") for determining which image components should be used to populate the locations in an image having locations identified as being variable. The rules 332 can include conditional logic for making the determinations based on information, such as an intended recipient, to facilitate targeted image generation.

The populating unit 336 can insert image components identified by the rules engine into the images at the locations that of been identified as being variable. In this manner, different image components can be inserted into a base image to form unique images, which can be printed by the printing system 120 to form prints that can be cut by the cutting system. The populating unit 336 can retrieve image components from an image component database, which can store the image components as well as image component information. Once the image is populated, the image can be output to the process manager 350.

The process manager 350 can interface with the printing system 12, cutting system 140, image segmenter 300, and/or the generator 330. The process manager 350 can manage print jobs to be processed by the unit 250 and can send the print jobs as well as image component metadata concerning the images in the print job to the printing system 120 and/or the cutting system 140. The process manager 350 can receive status information and process information from the printing system 120 and/or the cutting system 140 can act as an intermediary between the printing system 120 and the cutting system 140. For example, the printing system 120 can identify the image that was just printed by the printing system 120 for the process manager 350 and the process manager 350 can forward the image component metadata to the cutting system 140 so that the cutting system can prepare a image-content dependent cut pattern to the cut the print with the identified image.

Figure 4:
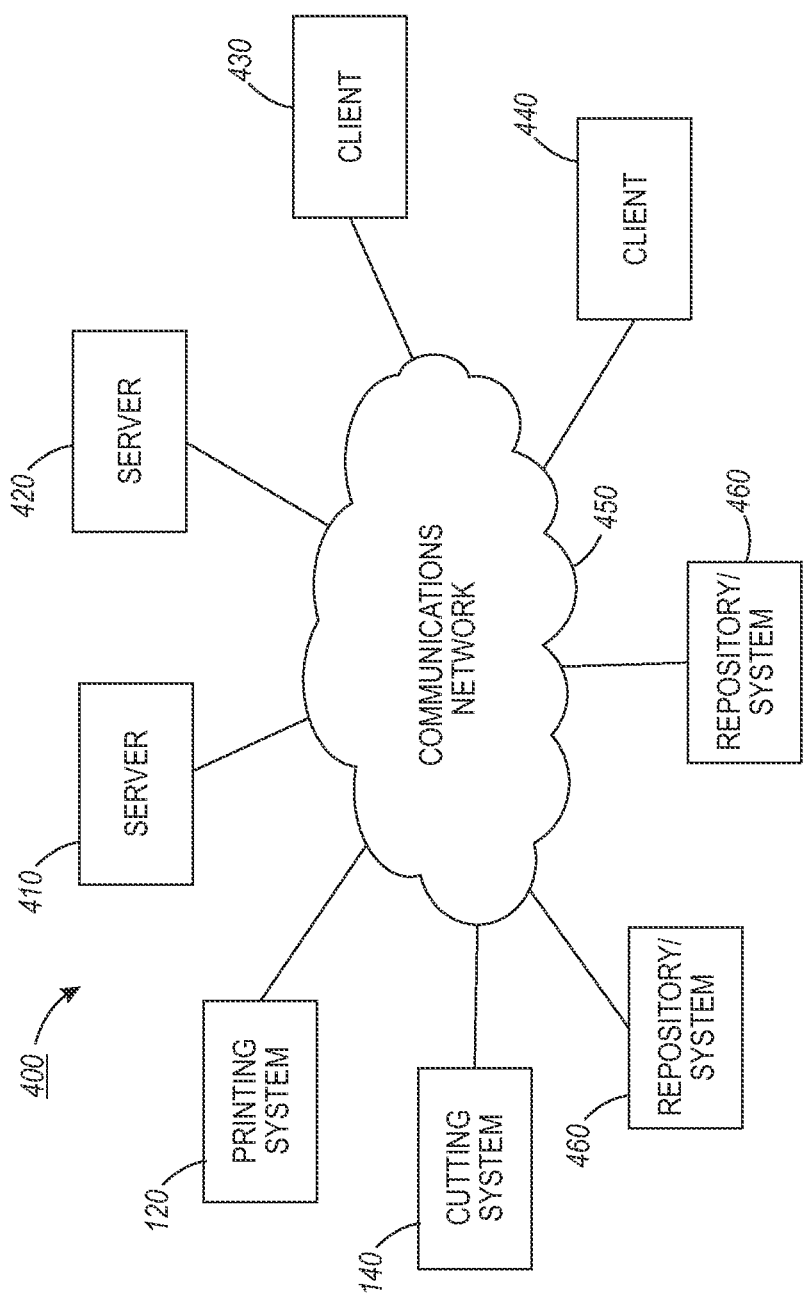
FIG. 4 depicts an exemplary computing system for implementing embodiments of an image-content dependent print cutting system in a networked environment.

FIG. 4 depicts an exemplary networked system 400 for implementing embodiments of the system 100. The system 400 includes one or more servers 410 and 420 coupled to the printing system 120, the cutting system 140, and one or more clients 430 and 440, via a communication network 450, which can be any network over which information can be transmitted between devices communicatively coupled to the network. The system 400 can also include repositories or database devices 460, which can be coupled to the servers 410/420, clients 430/440, the printing system 120, and/or the cutting system 140 via the communications network 450. The servers 410/420, clients 430/440, and database devices 460 can be implemented using a computing device, such as a computing device implemented in a similar manner as the computing device 300 of FIG. 3. In some embodiments, the system 110 can be implemented using a single computing device or can be implemented using multiple computing devices in a distributed manner.

The servers 410/420, clients 430/440, and/or databases 460 can store information, such as images, image component metadata, image components, printing parameters, cutting parameters, and the like. In some embodiments, the system 110 can be distributed among the servers 410/420, printing system 120, cutting system 140, clients 430/440, database devices 460 such that one or more components of the system 110 and/or portion of one or more components of the system 110 can be implemented by a different device (e.g. clients, servers, printing system, cutting system, databases) in the communication network 450. For example, the portions of the system 110 can be resident on the servers 410/420, clients 420/430, the printing system 120, and/or the cutting system 140.

Figure 5:
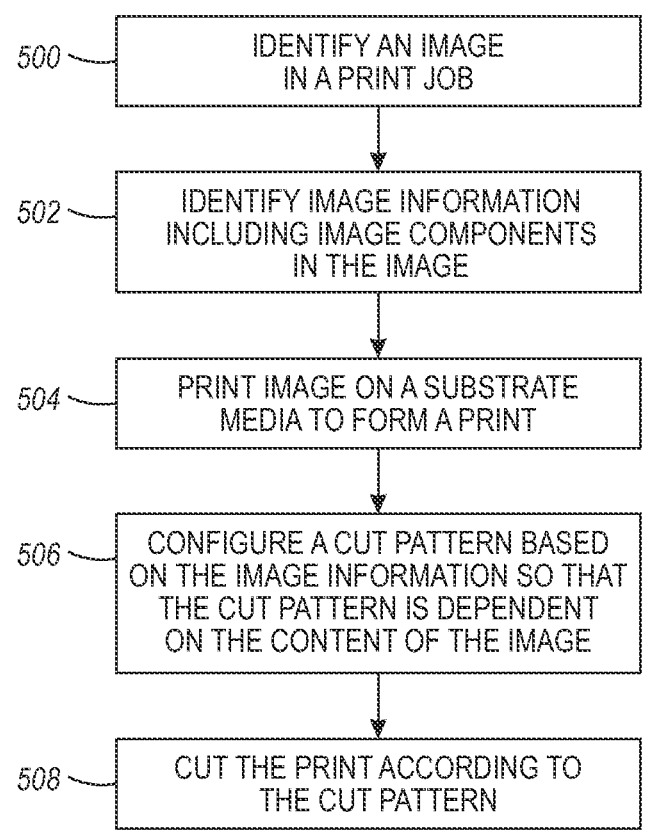
FIG. 5 is a flowchart illustrating an exemplary process of cutting/trimming a print based on the content of the print.

FIG. 5 is a flowchart illustrating an exemplary image-content dependent print cutting process. An image in a print job to be printed can be identified (500) and image component metadata including image components in the image can be identified (502). In some embodiments, the image components can be identified using one or more image segmentation processes. For example, the image segmenter can segment the input image based on backgrounds, data seams, object recognition, and the like. In some embodiments, the image components can be identified based on image components inserted into a variable data image. In some embodiments, image components can be identified in the image file and/or in a separate file associated with the image file. The image can be printed on a substrate media by the printing system to form a print (504).

The print can be transported to the print cutting system. The print cutting system can configure a image-content dependent cut pattern for use by the print cutter using the image component metadata associated with the image on the print so that the image-content dependent cut pattern is dependent on the content of the image (506). For example, the image-content dependent cut pattern can be generated to correspond to the image components of the image. Once the image-content dependent cut pattern is specified, the print cutting system can cut the print according to the image-content dependent cut pattern (508). For example, the print cutting system can be configured to cut the image components out of the print so that, for example, the image components in the print are separated from the remainder of the print.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An image-content dependent system for cutting a print in response to content of an image disposed on the print, the system comprising:
a processor for processing an image in a print job to identify a plurality of image components independent of an image selection of a user and independent of how the image is formed, the processor associating image component metadata corresponding to the identified image components with the image;
a printer for printing the image including the plurality of image components;
a print cutter to cut a print according to an image-content dependent cut pattern wherein at least one image is separated from other image components which form the print;
a computer storage device to store the image component metadata from image content of the image disposed on the print to be cut; and
a processing device using the image component metadata to generate the image-content dependent cut pattern to be used by the print cutter to cut the print.

2. The system of claim 1, wherein the print cutter cuts a plurality of prints and the processing device configures the image-content dependent cut pattern used by the print cutter on a print-by-print basis.

3. The system of claim 1, wherein the image component metadata includes information about the image components identified in the image disposed on the print, the information selected from the group consisting of image geometry, position, orientation, contrast, color, outline, and contour.

4. The system of claim 3, wherein the image components are identified using an image segmenter.

5. The system of claim 3, wherein the image components are predefined components inserted into the image by a variable data image generator.

6. The system of claim 3, wherein the image-content dependent cut pattern is configured to correspond to the image component.

7. The system of claim 6, wherein the image-content dependent cut pattern is configured to cut the print about an outline of the image component.

8. The system of claim 1, further comprising a scanning device to scan the image disposed on the print, the image scanned from the print being processed to identify image component metadata for the image to be used to configure the image-content dependent cut pattern.

9. An image-content dependent system for cutting a print in response to content of an image disposed on the print, the system comprising:
a job configuration system to generate a print job including images the images being formed of image components, the job configuration system generating image component metadata for each of the image components from image content of each of the images of the print job;
a printing system to print the images of the print job on substrate media to form prints, the images including a plurality of image components; and
a cutting system to generate image-content dependent cut patterns for each of the prints received from the printing system using the image component metadata corresponding to printed on the prints and to cut each of the prints according to the image-content dependent cut patterns, wherein at least one image is separated from other image components which form the print.

10. The system of claim 9, wherein the job configuration system is configured to search the images in the print job and identify image components in the images, and the job configuration system being configured to segment the image into image components using one or more image segmentation processes.

11. The system of claim 10, wherein the one or more image segmentation processes include object recognition.

12. The system of claim 9, wherein the job configuration unit is configured to generate an image component using a variable data image generator, wherein image components are inserted into the images at predefined locations identified as variable, and information about the image components is included in the image component metadata.

13. The system of claim 9, wherein the cutting system comprises:
a print cutter to cut the prints according to the image-content dependent cut patterns;
a computer storage device to store the image component metadata corresponding to each of the images disposed on the prints to be cut; and
a processing device to configure the image-content dependent cut patterns used by the print cutter in response to the images disposed on the prints and the image component metadata so that the image-content dependent cut patterns are dependent on content of the images disposed on the prints.

14. The system of claim 9, wherein the cutting system includes a scanning device to scan the images disposed on the prints, the images scanned from the prints being processed to identify image components for the images to be used to configure the image-content dependent cut patterns.

15. A method for cutting a print comprising:
generating image component metadata from image content of an image including a plurality of image components disposed on the print to be cut independent of an image selection by a user and independent of how the image is formed;
printing the print including the plurality of image components;

generating an image-content dependent cut pattern using the image component metadata;

configuring a print cutter to cut a print according to the image-content dependent cut pattern; and cutting the print with the print cutter according to the image-content dependent cut pattern wherein at least one image is separated from other image components other image components which form the print.

16. The method of claim 15, further comprising segmenting the image into one or more image components, and information concerning the image of the one or more image components being included in the image component metadata.

17. The method of claim 15, further comprising identifying variable location in the image, generating an image component using a variable data image generator, the variable data image generated inserting the generated image component into the variable location of the image, and information concerning the image component is included in the image component metadata.

18. The method of claim 15, further comprising cutting a plurality of prints, wherein a plurality of image-content dependent cut patterns are specified for the prints in response to images disposed on the prints and the image information associated with each of the prints so that the image-content dependent cut patterns are dependent on content of the images disposed on the prints.

19. The method of claim 15, wherein the image-content dependent cut pattern is specified on a print-by-print basis.

20. The system of claim 4, wherein the image segmenter includes an image mapper which assigns component identifiers to each of the image components, classifies the image components based on the content of the image components, and associates the image component information with the identifier.

* * * * *